United States Patent [19]

Lake

[11] Patent Number: 4,726,263

[45] Date of Patent: Feb. 23, 1988

[54] EXTENDED REACH DEVICE FOR AUTOMOTIVE USE

[76] Inventor: James N. Lake, 3664 Koskela Dr., Sparks, Nev. 89431

[21] Appl. No.: 945,795

[22] Filed: Dec. 23, 1986

[51] Int. Cl.⁴ .......................... B25B 33/00; B25J 1/00

[52] U.S. Cl. .......................... 81/15.9; 81/484; 294/19.1; 294/24; 294/92

[58] Field of Search .................... 294/19.1, 22, 24, 26, 294/92, 99.1; 29/278; 81/13, 15.9, 484, 487, 488; 254/12, 21, 22, 25, 131

[56] References Cited

U.S. PATENT DOCUMENTS

| | | | |
|---|---|---|---|
| 149,713 | 4/1874 | Boss | 294/92 X |
| 3,340,750 | 9/1967 | Noorlun | 81/15.9 |
| 3,760,656 | 9/1973 | Veach | 294/19.1 X |
| 3,764,175 | 10/1973 | Yavitch | 294/19.1 X |
| 3,819,221 | 6/1974 | O'Connor | 294/19.1 X |
| 4,015,871 | 4/1977 | Koerbel et al. | 294/19.1 X |
| 4,248,465 | 2/1981 | Halstead | 294/19.1 X |
| 4,622,868 | 11/1986 | Flannigan | 81/15.9 |

*Primary Examiner*—Johnny D. Cherry

*Attorney, Agent, or Firm*—Thorpe, North & Western

[57] ABSTRACT

A device for extending reach of a driver within a vehicle for operation of toggle, push-pull and lift levers and other buttons such as door lock devices. The devices comprises an elongated handle having an operating end and an opposing gripping end. A T-shaped plate member is coupled at the operating end and includes an annular grommet for use with headless, anti-theft lock knobs, a slotted channel for conventional lock knobs and a domed recess to provide a homing location for the head of the lock knob when depressing it to its locked configuration.

9 Claims, 9 Drawing Figures

EXTENDED REACH DEVICE FOR AUTOMOTIVE USE

BACKGROUND OF THE INVENTION

1. Field of Invention

The present invention relates to extended reach devices for use within a vehicle. More specifically, the present invention pertains to such devices which are useful for unlocking doors or opening/closing levers at remote parts of the vehicle from the operator.

2. Prior Art

Frequently, a vehicle driver will be the sole occupant, yet may need to lock or unlock a passenger door, raise or lower a window, or operate a push/pull lever such as a floor vent. If the driver has secured his seat belt it would be very inconvenient to make such adjustments. Without an extended reach device, the driver must remove the seat belt and shift his position to be within reach. This is particularly cumbersome in larger cab areas in vans, trucks or the like.

In response to this need, several extended reach devices have been developed. U.S. Pat. No. 3,819,221 by O'Connor illustrates an elongated bar which includes a slot at one end designed to laterally engage a door lock button. The bar is then twisted about its longitudinal axis in a manner to lift the head of the door lock button to an unlocked position. Similarly, the door may be locked by positioning a recess at an opposite end of the bar over the enlarged head of the button and pressing to engage the button into its locked position.

U.S. Pat. No. 3,760,656 of Veach illustrates an earlier embodiment which is operated in a similar manner. The structure of Veach utilizes a forked member which includes a slot sized to laterally engage the shank of the door lock button similar to the explanation given for O'Connor. Opposite the fork member was a flat head which was utilized to strike the button and drive it into its locked position. U.S. Pat. 3,764,175 discloses another embodiment of the fork configuration wherein the slot of the fork extends along the axis of the handle.

Each of these prior art structures, however, fails to operate in the environment of new automobiles having a headless, anti-theft configuration on the lock button. With the headless button, the slotted configuration of the representative prior art devices passes free of the knob without pulling it from its locked position. Furthermore, not all car models having door locks with heads will operate with the prior art slotted configuration. Chrysler products for example have unique requirements. What is needed, therefore, is a single extended reaching device which can engage a variety of lock knobs including headless lock knobs to be pulled to an unlocked condition.

OBJECTS AND SUMMARY OF THE INVENTION

It is an object of the present invention to provide an extended reach device which is useful with anti-theft lock buttons, as well as other lock button configurations.

It is a further object of the present invention to provide an extended reaching device of general utility which is also useful for extending or retracting push-/pull levers, latches and other maneuverable items which would otherwise be out of reach to an operator.

It is a further object of this invention to provide such a reaching device which includes convenient storage means for keeping it accessible to the operator when not in use.

These and other objects are realized in a device for extending the reach of a driver within a vehicle wherein the device includes an elongated handle and a plate member coupled to one end thereof in a T-configuration which projects outward along a longitudinal axis of the handle. The plate member includes an opening bounded on all sides by an opening perimeter which is formed in the plate and has a diameter and cross sectional configuration larger than that of a top end of a headless, anti-theft door lock button which is to be operated thereby. A frictional gripping surface is formed at an interior surface of the opening perimeter to develop an annular gripping body which is slightly larger than the top end cross section of the door lock button. This permits the button to pass through the opening and to be seated within the annular body. In addition, the plate may include a slotted opening at a forward end of the plate member to facilitate operation with respect to lock knobs having an enlarged head. A shorter slot or leg extends at right angles with respect to the entry slot, thereby forming an L-shaped configuration which enables improved control with respect to most door lock knobs having an enlarged head. The handle is preferably of telescoping construction and includes hardware for mounting the handle at a convenient location within the vehicle cab.

Other objects and features of the present invention will be apparent to those skilled in the art based upon the following detailed description of preferred embodiments, along with the accompanying drawings.

DETAILED DESCRIPTION OF THE INVENTION

Figure 1:
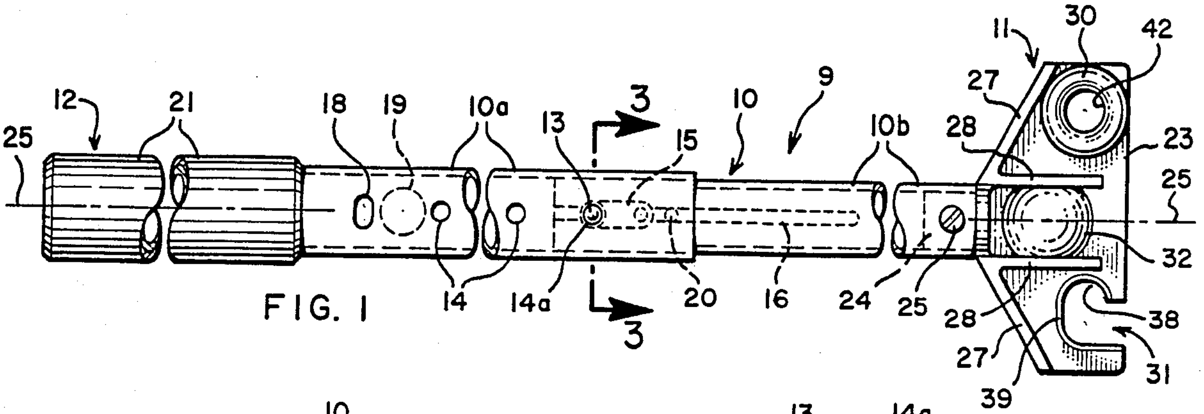
FIG. 1 is a top plan view of the extended reaching device representing the disclosed invention.
Figure 2:
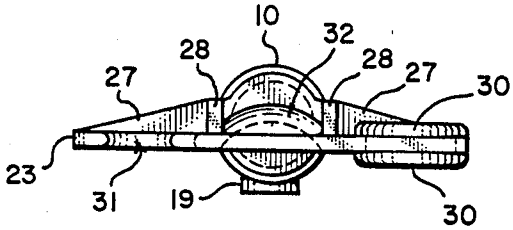
FIG. 2 is an end view taken along the right side of FIG. 1.
Figure 3:
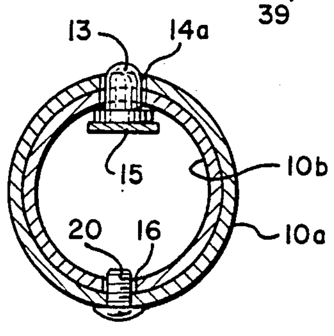
FIG. 3 is a cross section view taken along the lines 3—3 of FIG. 1.

A device for extending reach of a dnver within a vehicle is shown generally as item 9 and comprises an elongated handle 10 having an operating end 11 and a gripping end 12. A telescoping configuration for the handle 10 comprising a sleeve side **10*a* and a retractable side 10*b*. The left side of the retractable member 10*b* includes a position-lock spring button 13 which may be selectively seated in any of several lock button holes 14. A spring biasing lever arm 15** is riveted or otherwise attached at the retractable side 10*b*. The telescoping members are fitted with a tracking slot 16 (not shown in FIG. 1) on a side of the retractable side 10*b*. The embodiment shown in FIG. 1 is in a fully extended position with the spring lock button 13 in the distal hole 14*a* of the sleeve side 10*a*. In the retracted position, this spring lock button 13 would be positioned in a retention opening 18 which holds the telescoping member in its retracted position within the sleeve 10*a*. The sleeve side 10*a* of the handle also provides a mounting surface for magnetic support buttons 19 which are useful in storing the device in a magnetically attached manner at a metal face within the vehicle cab. A threaded end of the screw 20 provides the tracking member journaled within the slot 16 of the retractable side 10*b*.

It will be apparent to those skilled in the art that many variations of handle configuration can be applied to accomplish the extendable reach provided by the present invention. Such construction includes a single handle as well as the telescoping configuration illustrated in FIG. 1. Typical construction materials in both cases are metals, plastics or wood.

The gripping end 12 is adapted with a handle grip 21 such as a bicycle grip. Other grip means can likewise be applied.

The primary features of the present invention exist at the operating end 11 of the subject device. This operating end includes a plate member 23 which includes an attachment stub 24 which is secured by a mounting screw 25 through the handle 10*b*. The plate 23 projects outward along the longitudinal axis 25 of the handle. The plate member houses various shapes and components useful in manipulating and operating lock buttons, push-pull levers, toggle levers and handles at remote locations from the driver. The plate 23 is reinforced with a back wall flange 27 and a pair of vertical reinforcement flanges 28.

The plate itself includes three operating elements consisting of an annular grommet 30 mounted within a hole at one side of the plate member 23, a slotted channel 31 located at the opposing side of the plate member and a domed recess 32 centrally positioned in the plate along the longitudinal axis 25. These elements are graphically displayed in FIG. 4.

More specifically, the plate member includes an opening 35 which is bounded on all sides by an opening perimeter 36 formed within the plate 23. This opening 35 has a diameter and cross sectional configuration larger than that of a top end 40 of a headless, anti-theft door lock button 41 to be operated thereby.

This opening provides attachment support for the annular grommet 30 which provides a frictional gripping surface 42 which is positioned at or within an interior surface of the opening perimeter 36. This grommet provides an annular gripping body which is slightly larger than the top end cross section of the door lock button 41, allowing the opening of the annular body to slide over the lock button into a nested position. The handle 10 is then rotated as shown at item 43 to raise the lock button to disengage the door lock. The frictional contact occurring between the side walls of the lock button 41 and the gripping surface 42 of the rubber grommet pass the lifting force required to raise the lock button.

Figure 6:
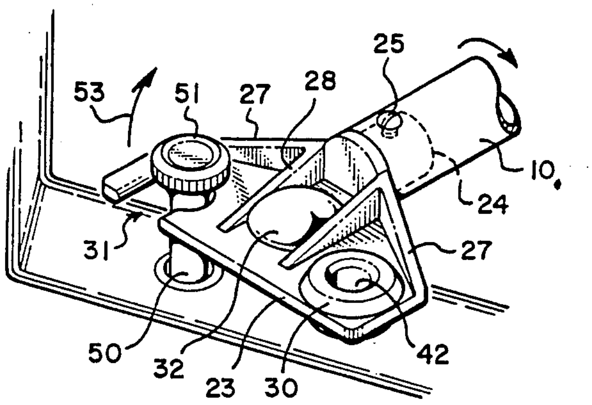
FIG. 6 discloses a mode of operation of the present invention with respect to a lock knob having an enlarged head.

The second operating member of the plate comprises the slotted channel 31. This channel 31 is positioned in a second leg of the plate, opposite the first plate leg having the rubber grommet 30. As shown in the figures, these respective legs of the plate member form the cross member of a T-configuration with respect to the handle 10. The channel opening is oriented along the same direction as the central axis 25 of the handle to facilitate direct insertion of a door lock device 50 as shown in FIG. 6. Accordingly, the slotted channel is approximately parallel with and offset from the longitudinal axis 25 as illustrated. The width of the channel is greater than the diameter of a shank section of the door lock button 50 to be engaged therein.

The slotted channel also includes a shorter slot 38 which extends at right angles with respect to the longitudinal axis 25 of the handle, extending from the closed end 39 of the slotted channel. Accordingly, the slotted channel and smaller slot form an L-configuration which provides improved seating of the head 51 of a lock knob 50. A significant advantage arises as the head is caught within the smaller slot 38 during rotation 53 of the arm of the device 10. This prevents the lock knob 50 from sliding out the slotted channel opening and free from the plate 23. Although the figures show the shorter slot 38 extending toward the central axis of the handle, it will be apparent that its orientation could likewise extend away from the central axis 25. This shorter slot will always have a depth of less than 1 centimeter, and preferably is approximately 4 millimeters offset from the slotted channel.

Figure 5:
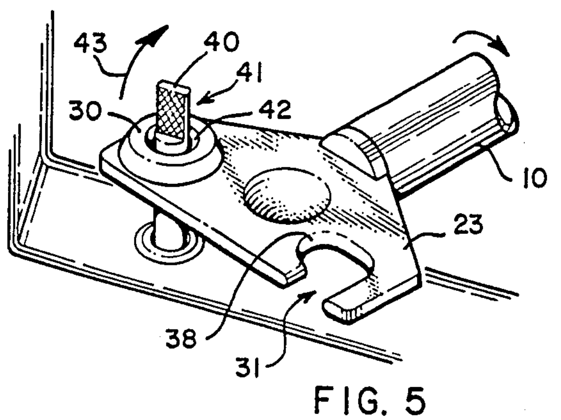
FIG. 5 illustrates operation of the present invention with respect to a headless, anti-theft style lock button.

The final element is a dome shaped recess 32 which has a convex configuration on the reinforced side of the plate shown in FIG. 5 and a concave configuration on the opposing side as shown in FIG. 6. This component is used to urge the door lock knob into its lowered position to engage the locking hardware of the door. The head of the door lock knob is placed within the concave recess 32 and force is applied against the handle to urge the lock knob into its lowered position.

Figure 4:
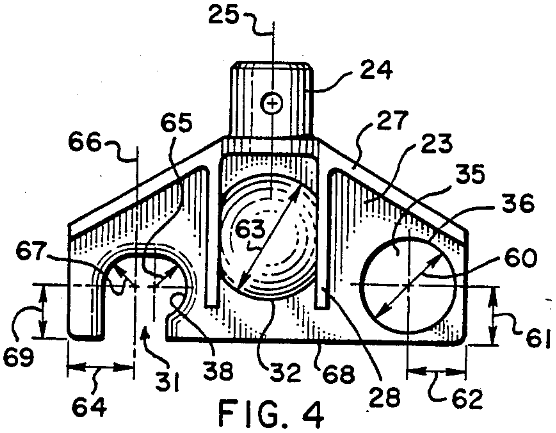
FIG. 4 is a graphic representation of the operating end of the extended reach device of the present invention.

Typical dimensions for the elements of the subject operating end are set forth in FIG. 4. The diameter 60 of the plate opening 36 is approximately 0.625 inches or 1.59 centimeters. The center of the plate opening 36 is approximately positioned 0.375 inches or 0.95 centimeters from each adjacent side wall as shown by items 61 and 62. The domed recess 32 has a diameter of approximately 0.812 inches or 2.06 centimeters as shown at item 63. The slotted channel 31 has its longitudinal axis offset from the side wall by distance of 0.437 inches or 1.11 centimeters as illustrated at item 64. The shorter slot 38 is formed by a radial cut of 0.406 inches 65 offset by approximately 4 millimeters from the longitudinal axis 66 of the slotted channel. The closed end of the slotted channel likewise has a radius of approximately 0.406 inches or 1.03 centimeters as shown in item 67. These respective circular cuts 65 and 67 have their centers displaced 0.343 inches from the front edge 68 of a plate member as shown in item 69. This combination of approximate dimensions has been found to be effective in balancing the appropriate leverage, standard lock knob sizes and slotted utility for other applications such as push-pull levers, elongated handles and other operated items within a vehicle.

Figure 7:
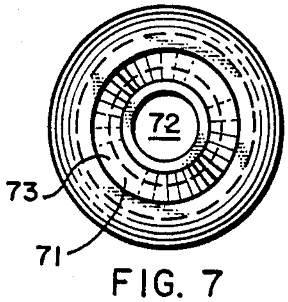
FIG. 7 is a cross sectional view of a rubber grommet for use with headless lock buttons.
Figure 8:
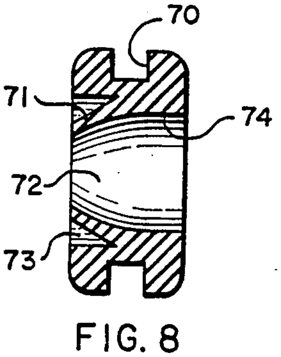
FIG. 8 is a top view of the rubber grommet shown in FIG. 7.

Another example of a rubber grommet which would be positioned within the plate opening 36 is shown in FIGS. 7 and 8. It includes an annular channel 70 which seats at the opening perimeter of plate opening 36 and stabilizes the grommet in an operating position within that opening. The grommet includes an annular converging section 71 which operates to increase the frictional grip at the shank of the headless door lock knob as it is inserted through the grommet opening 72. The annular gap 73 facilitates expansion of the converging section. This configuration is most effectively used by placing the lock knob 40 within the opening 72 until the shank of the knob is gripped within the enclosing annular portion 71. The grommet is then rotated about its central axis to twist the pliable rubber contacting surface around the knob 41. Once a complete grip is secured between the gripping surface 74 and the contained knob 41, the arm 10 of the device is rotated upward 43 raising the headless knob to its unlocked position.

Figure 9:
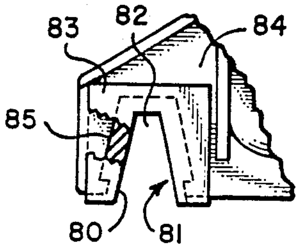
FIG. 9 illustrates another embodiment of a slotted configuration for use with lock knobs having either an enlarged head or headless anti-theft style knob.

FIG. 9 discloses an additional embodiment of a slotted channel 80 which converges from a larger opening 81 to a narrower neck 82. Likewise, this comprises a rubber grommet 83 which is seated at the plate member 84 on a peripheral slot 85. Although not shown in the drawings, this slot 85 is similar to the channel 70 shown in FIG. 7. This configuration offers an alternate operating element to the L-shaped channel 31 previously disclosed. It may also be used to operate the headless anti-theft button. The converging shape of the slot enables its use with both headless and headed knobs where the narrow end of the slot grips the shank of the knob.

It will be apparent to those skilled in the art that other variations may be developed with respect to the subject to the subject invention. Accordingly, it is to be understood that the scope of the invention is not to be limited by the various examples provided herein, but rather in accordance with claims as will follow.

The primary function of this tool is to provide an easy way to reach and operate the locks, levers, and push-pull devices which are beyond the reach of the driver. It is operable with respect to both domed or mushroom head lock buttons as well as headless anti-theft type buttons, to current vehicles. All of the operating elements are positioned in proximate relationship to eliminate the need for turning the tool to manipulate different devices.

The T-shaped head offers numerous advantages with respect to developing leverage and providing quick and convenient access for the operating slots and openings with respect to the manipulated vehicle parts. For example, the annular grommet is easily positioned over the headless lock knob 41 and seated in position, allowing a gripping action to be applied with a slight twist of the handle. The T-shaped body permits rotational leverage to be applied to lift the lock knob from its engaged position. Similarly, the slotted channel provides knob entry along the axis of the handle to enable the driver to more easily engage the knob. Both the grommet 30 and the dome 32 provide a fulcrum point for that which is pliable and non-abrasive to vehicle interiors.

The L-shaped slotted channel facilitates gripping of all lock knobs, including the more difficult Chrysler product knobs. In addition, it facilitates grasping push-pull levers such as may be used at vents and heating locations, as well as door and window handles. The improved convenience of this device over prior art devices is significant because drivers are not always fortunate to have calm circumstances and adequate time to quickly manipulate the various devices in a vehicle. The centered relationship of the domed locating pocket 32, for example, quickly enables the driver to lock the door in the event of an emergency, without having to orient an offset locating recess at the top of the lock knob. Similarly, the rubber grommet opening is quickly placed over the lock knob and the slotted channel opening can accurately be positioned around the lock knob with little orientation effort. When retained at a metal surface convenient to the driver, the device can be grasped, positioned and operated within a matter of seconds to obtain the desired operating result.

I claim:

1. A device for extending reach of a driver within a vehicle to operate toggle and push/pull levers and buttons on the remote side of the vehicle and out of reach of the operator, said device comprising:

an elongated handle having a operating end and an opposing gripping end;

a plate member coupled to said operating end and projecting outward therefrom along a longitudinal axis of the handle, said plate member forming a cross member with respect to the operating end of the handle in a T-configuration incluidng first and second legs of the cross member.

the first leg of the cross member including an opening formed therein and having a diameter and cross-sectional configuration larger than that of a top end of a headless, anti-theft door look button to be operated thereby to permit the door button to pass through the opening;

a frictional gripping surface positioned within an interior surface of the opening to form an annular gripping body which is slightly larger than the top end cross section of the door lock button to allow the button to nest therein.

2. A device as defined in claim 1, wherein the second leg of the cross member includes a slotted channel having a width greater than the diameter of a shank section of a door lock button to be engaged therein.

3. A device as defined in claim 2, wherein a longitudinal axis of the slotted channel is approximately parallel with and offset from the longitudinal axis of the handle.

4. A device as defined in claim 3, further comprising a shorter slot extending at right angles with respect to the longitudinal axis of the handle from a closed end of the slotted channel, thereby forming an L-configuration for the slotted channel.

5. A device as defined in claim 4, wherein the shorter slot extends inward toward the central axis of the handle for a distance of less than 1 cm.

6. A device as defined in claim 4, wherein the shorter slot extends inward toward the central axis of the handle for a distance of approximately 4 mm.

7. A device as defined in claim 2, wherein the annular gripping body comprises a pliable rubber grommet sized to fit within the plate opening and having an inner diameter and configuration which is slightly larger than the top end of the door lock button but which is the approximate same diameter as a lower shank portion of the lock button such that the inner diameter of the grommet makes peripheral contact with the outer diameter of the shank, thereby providing a contact gripping action at the shank of the door lock button therein.

8. A device as defined in claim 1, wherein the annular gripping body comprises a rubber grommet sized to fit within the plate opening and having an inner diameter and configuration which permits insertion of the top end of the door lock button therein.

9. A device as defined in claim 1, wherein the opening is bounded on all sides by an opening perimeter formed within the plate.

* * * * *